United States Patent [19]

Brown

[11] Patent Number: 5,235,750
[45] Date of Patent: Aug. 17, 1993

[54] HAND TOOLS

[76] Inventor: Frank R. Brown, Ward Rd., Cape Porpoise, Me. 04014

[21] Appl. No.: 885,365

[22] Filed: May 19, 1992

[51] Int. Cl.$^5$ ............................................. B26B 13/00
[52] U.S. Cl. ........................................ 30/135; 30/134
[58] Field of Search ................ 30/135, 233, 254, 261, 30/134

[56] References Cited

U.S. PATENT DOCUMENTS

| | | | |
|---|---|---|---|
| 257,389 | 5/1882 | Sager | 30/134 |
| 681,972 | 9/1901 | Postlethwait | 30/134 |
| 747,359 | 12/1903 | Barnard | 30/135 |
| 835,791 | 11/1906 | Kelly | 30/135 |
| 1,123,929 | 1/1915 | Russell | 30/134 |
| 1,444,044 | 2/1923 | Tener | 30/134 |
| 1,576,359 | 3/1926 | Rauha, Jr. | 30/135 |
| 1,650,948 | 11/1927 | Long | 30/135 |

Primary Examiner—Douglas D. Watts
Assistant Examiner—Hwei-Siu Payer
Attorney, Agent, or Firm—William G. Rhines

[57] ABSTRACT

Shear-type cutters for hard and/or large thickness workpieces having a pair of shearing-action cutting jaws, laterally abutting each of which jaws is a hold-down clamp member having a hold-down surface positioned opposite the other of said jaws. Each hold-down surface is moveable with respect to its associated jaw away from the jaw it opposed through a wide range of distances, normally is in alignment with the cutting surface of the jaw to which it as affixed, and is resiliently biased against being so moved. Thereby, when the jaws close on a workpiece of any of a wide range of thicknesses, the hold-down surfaces of the clamps come into contact with and yieldingly remain pressed against the outer surfaces of the work piece to hold it in place as the cutting jaws impinge upon and cut through it.

4 Claims, 2 Drawing Sheets

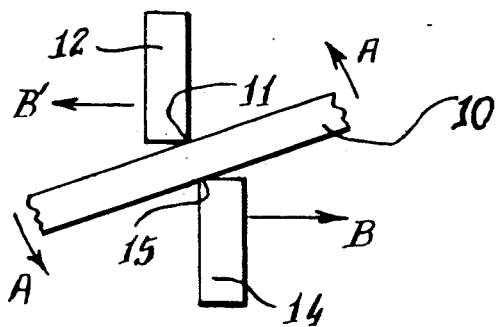
Fig. 1.
PRIOR ART
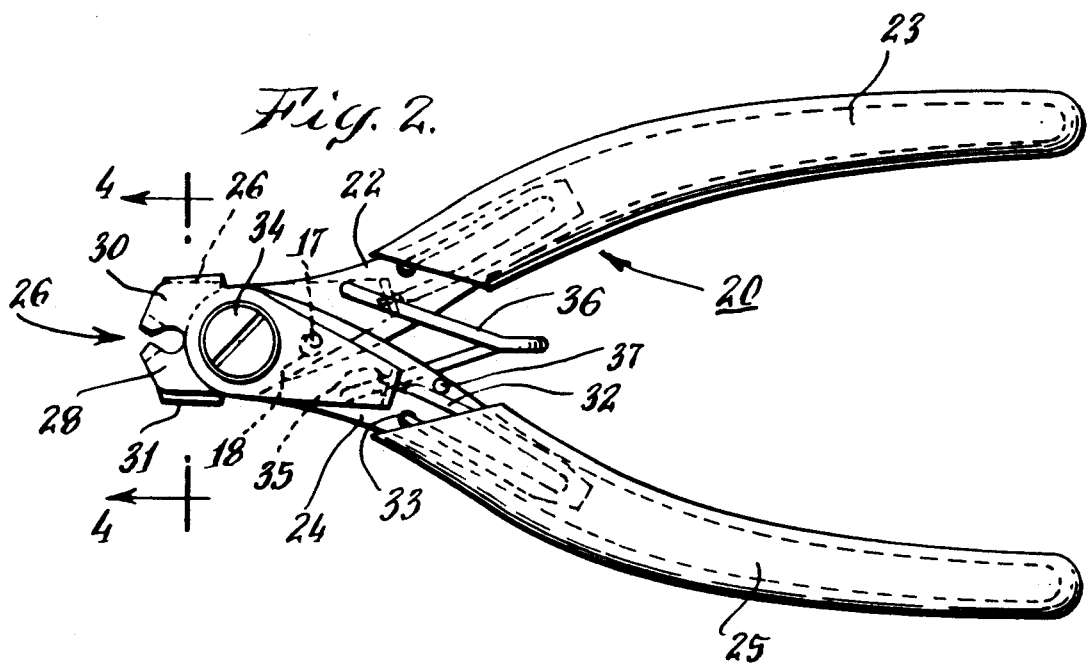
Fig. 2.
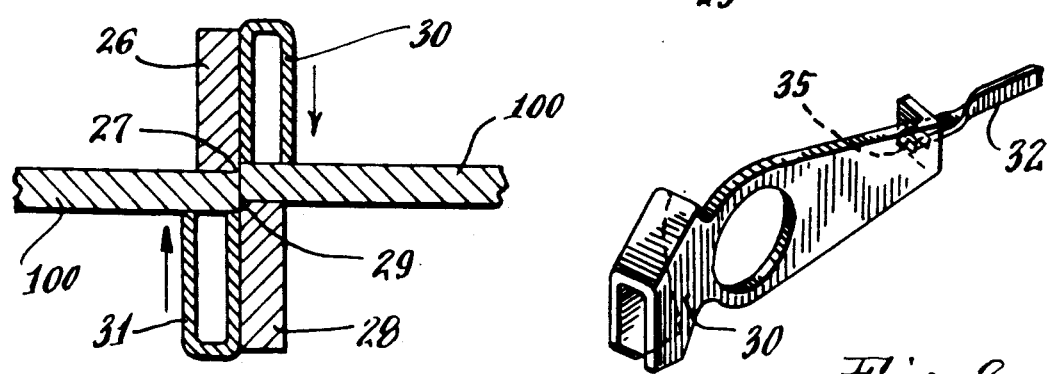
Fig. 4.
Fig. 3.

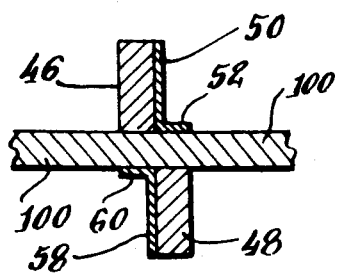
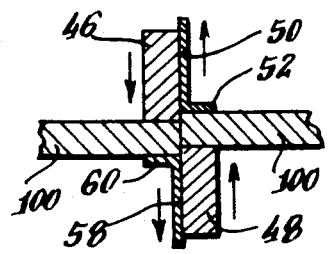
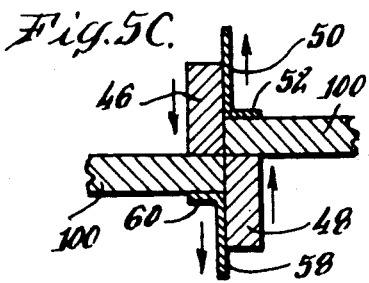
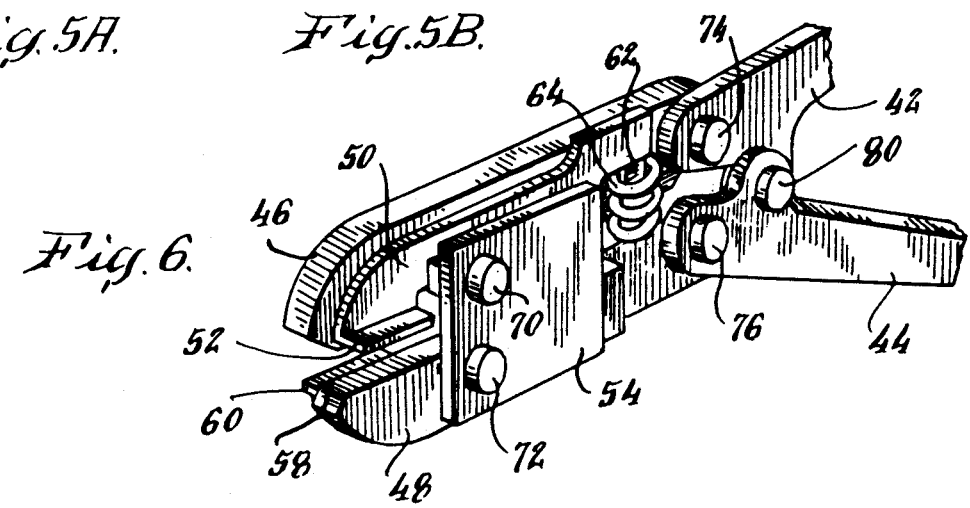
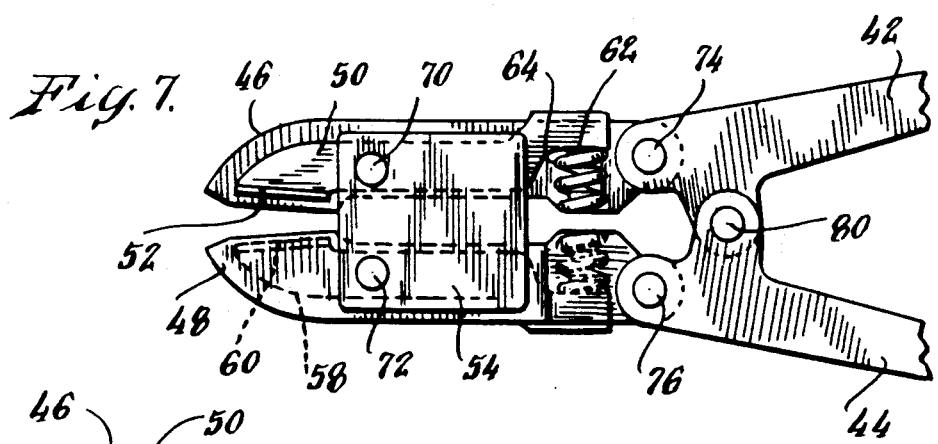
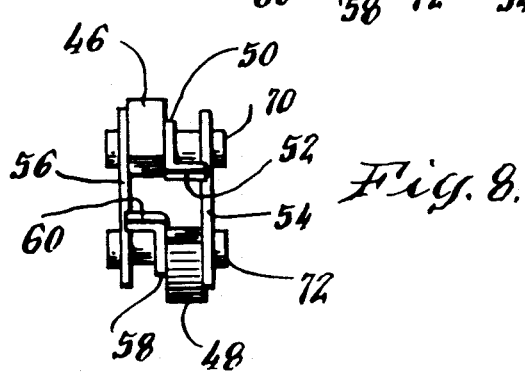

HAND TOOLS

BACKGROUND OF INVENTION

Typically, hand cutters of the type that are used to sever work pieces, such as lengths of wire, operate either on the principle of compression cutting or of shearing. In either case, such cutters usually consist of pivotally joined members, each of which has a handle end and a cutter end, whereby closure of the handles produces corresponding closure of the cutting surfaces.

In compression type hand cutting tools, each cutting end is formed with surfaces that intersect each other at an acute angle to form a cutting edge. When the cutting ends are closed, the cutting edges abut each other substantially throughout their length. The effect is an incisor-like, pincer action which causes the work piece to separate under stress as the cutting edges are forced through it. This type of action usually operates well with workpieces which are small in size and/or made from material that is soft or malleable, such as copper. It usually is less effective with materials that are comparatively large unless they are very soft, or those which are comparatively hard, since severed segments of the piece may fly dangerously, and the cut end of the workpiece itself typically is left with a burr, a sharp point or a ridge. Further, the edges on such tools must be very hard and must be sharpened frequently since their effectiveness as cutting devices is largely dependent upon these factors and they function in an environment in which they are highly susceptible to wear. In addition, in order to get sufficient leverage to cut larger workpieces, the jaws must be opened widely, which compromises the leverage needed to effect a cut, particularly with harder materials.

In shearing action type devices, separation of segments from the work piece is effected by shear. In the manner of scissors, the cutting action is produced by causing the cutting edges of two flat blades to by-pass each other while the flat surfaces of the blades are in abutting contact. This type of action is particularly adapted for cutting comparatively soft, small workpieces, especially when in flat or sheet form, and is less likely to cause severed segments to fly or to produce points or to produce imperfections on the cut end of the workpiece. However, with such devices there is an increased tendency for workpieces to twist in response to the blade action, causing the blades to spring apart from each other as the workpiece becomes wedged between them. In view of this, using a shear type action mandates that the blades be made from heavy material to prevent these results from occurring, with consequent greater difficulty to form them into their desired shapes, and added cost, weight, and difficulties in sharpening and handling.

In both of these types of devices, the undesirable results of the suddenness with which severing can occur may not be limited to the cut segment flying, projectile-like, through the air, with the attendant dangers of that to personnel and equipment. In addition, the comparatively high work loads necessary to complete the severing operation, and the suddenness with which actual severance takes place, can have the effect of introducing a sever shock to the workpiece itself. If the situation is such that, for example, the wire or other workpiece being cut is attached to a sensitive or fragile or otherwise damage susceptible element, such as an electronic component, the resulting shock may be sufficiently severe to render the element inoperative, unreliable, or damaged.

While in either case it might be possible to retain segments cut off from a workpiece from flying dangerously through the air by means, such as shroud or a separate clamp, the disadvantages of having to resort to and separately manipulate such ancillary equipment are obvious. Further, to use such extra devices may restrict the orientation in which the cutting tool may be used, thus further complicating its use as a practical matter.

Accordingly, it is an object of this invention to provide means to cut segments from workpieces.

Another object of this invention is to provide such means that is adapted to cut comparatively hard materials.

Still another object of this invention is to provide means for satisfying one or more of the foregoing objectives that is adapted to cut comparatively large thickness or large diameter materials.

Another object of this invention is to provide means for satisfying one or more of the foregoing objectives that is adapted to retain segments cut from the workpiece after they have been cut from it.

Yet another object of this invention is to provide means for satisfying one or more of the foregoing objectives that is adapted to retain a large variety of diameters of cut workpieces.

A further object of this invention is to provide means for satisfying one or more of the foregoing objectives that is adapted to retain segments cut from the workpiece after they have been cut from it regardless of the positional orientation of the cutting means.

Still another object of this invention is to provide means for satisfying one or more of the foregoing objectives that is adapted to dampen mechanical shock resulting from the cutting operation from being transmitted along the workpiece.

Yet another object of this invention is to provide means for satisfying one or more of the foregoing objectives that is adapted to limit or prevent twisting of the workpiece being cut.

STATEMENT OF INVENTION

Desired objectives may be achieved through practice of this invention, embodiments of which comprise a shear-type cutter having a pair of shearing-action cutting jaws, affixed to each of which is a hold-down clamp member that is freely and distantly moveable from its normal position with respect to that jaw; each clamp member having a hold-down surface that is positioned opposite the other jaw and normally is in alignment with the cutting surface of the jaw to which it is affixed; each clamp being biased by resilient biasing means against its said hold-down surface being moved out of said alignment in the direction in which the other jaw member, relative to said surface, moves when closing; whereby when the jaws close on a workpiece, the lamps come into contact with and yieldingly remain pressed against the outer surfaces of the work piece to hold it in place as the cutting jaws impinge upon and cut through it.

DESCRIPTION OF DRAWINGS

This invention may be understood from this specification and the accompanying claims, and from the accompanying drawings in which FIG. 1 is a cross section illustrating prior art devices, FIG. 2 is a plan view of an embodiment of this invention, FIG. 3 is a detail perspective view of the hold-down clamp element shown in embodiment of this invention illustrated in FIGS. 2 and 4, FIG. 4 is a cross sectional view taken through section line "4—4" in FIG. 2, FIGS. 5A through 5C inclusive are cross sectional views of successive stages of operation of another embodiment of this invention, FIG. 6 is a perspective view of another embodiment of this invention, FIG. 7 is a plan view of the embodiment of this invention shown in FIG. 6, and FIG. 8 is an end view of the embodiment of this invention shown in FIGS. 6 and 7.

DESCRIPTION OF PREFERRED EMBODIMENTS

Referring first to FIG. 1, there is depicted a front cross sectional view of the cutting jaws 12, 14 of a prior art hand operated, shear type wire cutter. As such, it is plier-like in configuration, including handles (not shown) which may be caused to move toward each other by squeezing with the hand. This causes a corresponding closure motion of cutting jaws 12, 14 so that their cutting edges 11, 15 respectively, impinge upon the outer surfaces of a workpiece 10, such as wire, ribbon, strip or sheet material, or the like. If the workpiece is not too hard and is small in its thickness or diameter dimension, or if it is larger but sufficiently soft and malleable, the affect of closure of the cutting blades 12, 14 can be to effect cutting by a shearing action as the cutting blades pass each other and move progressively through the workpiece. Paper, cloth, and soft or small dimension metals are examples of materials which typically may be cut by this method. Such cutters are also useful for cutting such things as soft copper of limited thickness (if it is in more or less flat form) or diameter (if it is a wire or other round form). If, however, the workpiece is very hard (such as piano wire, regardless of thickness), or although not very hard is too large in thickness or diameter, the results typically are as shown in FIG. 1. The workpiece torques (in this case, because if this particular orientation of cutting jaws with respect to each other, counterclockwise in direction A). If one or both ends of the workpiece are restrained, it may be bent or twisted, while the cutting jaw 12 may be forced in direction B away from cutting jaw 14 which is correspondingly forced in direction B'. The resulting potential for damage to the device and/or the workpiece is obvious, and, of course, the desired cut normally fails to be achieved. Further, the more widely the cutting surfaces of such cutters are opened to accommodate larger size workpieces, the more difficult it becomes to use hand manipulation to make the desired cut because being further apart, the handles provide poorer mechanical advantage.

FIGS. 2, 3 and 4 illustrate an embodiment of this invention which overcomes objectionable features of prior art devices. As such it comprises a shear type hand cutter 20 having opposing handles 22, 24 with associated handle covers 23, 25. The handles are pivotally moveable about a rivet 34 so that upon closure of the handles, their associated cutter jaw members 26, 28 will simultaneously be brought into cutting relationship to each other. In this embodiment, however, hold-down clamps 30, 31, are moveably affixed to are positioned side by side in paired relationship with each of the cutter jaw ends 26, 28 respectively, and are located so that the operative clamping surface of each clamp faces the other cutting jaw; i.e., the one with which the other of said clamps is paired. The hold-down clamps shown in FIGS. 3 and 4 are U-shaped in cross section and are oriented with their open ends facing in the direction in which the cutter end with which each of them respectively is paired moves during cutting closure. The mechanical advantages of this particular configuration will be apparent from the descriptions which follow. However, as will also be apparent from what follows, the particular design characteristics of the hold-down clamp, and more particularly its workpiece contact surface, may be in any of a wide variety within the contemplation of this invention. In general, however, whether in the U-shapes shown in FIGS. 3 and 4, or in the flat clamp surfaces shown in FIGS. 5 through 8 inclusive, or any other configuration, it usually will be advantageous for each of them to extend laterally some distance from the surface of the cutting member with which it is paired that does the actual cutting as this improves to mechanical advantage of the hold-down clamp on the workpiece being cut. It should also be noted that the hold-down surface of each hold-down clamp normally is substantially aligned with the cutting surface of the jaw with which it is paired. In this context, the word "aligned" means that the hold-down surface is more or less at the same level as that of the surface of its associated cutting jaw which faces the hold-down surface of the clamp affixed to the other cutting jaw, so that even though in side view such hold-down surface may not necessarily be truly parallel to the cutting edge of its associated jaw, they will, nevertheless, come into contact with the exterior surfaces of a workpiece substantially simultaneously.

As shown in detail in FIGS. 2 and 4, each of these hold-down clamps is free to pivot with respect to its associated cutter end and handle end. Each such clamp is normally biased toward having its workpiece contact surfaces aligned relationship with the cutting edge of the cutting member with which it is paired (i.e., clamp 30 with cutter 26, and 31 with cutter 28). This bias is provided by flat springs: i.e., spring 32 with respect to clamp 30 and the cutting member 26 with which it is paired; the spring corresponding to spring 32 which is connected to clamp 31 and the cutting member 28 with which it is paired being shown in FIG. 2 by dashed line representations. Each of these springs is more or less U-shaped, with the top of one leg of the U bent so as to fit into a hole in its associated handle member (33 in the case of handle 24), and the other leg of which is also bent and is adapted to be inserted into a hole (i.e., hole 35) in its associated hold-down clamp member. The hold-down clamp is prevented from exceeding that alignment by means of an opening stop pin 17 which resides in a larger diameter hole 18 located in the body of the handle 24. At the same time, however, the hole being larger in diameter than is the pin residing in it, the clamp member is free to move back so that its clamping surface does not remain in alignment with its associated cutting edge as that clamping surface comes into contact with a workpiece and its associated cutter end continues moving relative to the hold-down clamp along its closure and cutting path. The spring is held in place, and is rendered readily replaceable, by the handle cover 25 being so made as to be able to slip it onto and off the handle 24 with the base of the U-shaped spring inserted therebetween. A corresponding arrangement obtains with respect to handle 22 and its associated cover 23. Another spring, 36, normally biases the handle members 22, 24 toward an open position, against which bias works hand squeezing of the tool handles.

FIG. 3 is a perspective drawing of the clamp element 30 illustrated in FIGS. 2 and 4. In FIG. 3, details of that clamp element may be seen, including its (inverted) U-shaped clamp surface, the rivet hole by which it is moveably, pivotally associated with the cutter handle with which it is to be paired, and the spring hole 35 into which an end of the associated bias spring 32 is to be inserted. It is to be noted that in the accompanying Figures, the U-shaped clamp structures are shown as having the legs of the "U" the same length so that both of their respective ends come into contact with the workpiece more or less together and at the same time as the cutting edge of the cutting jaw to which each is affixed. However, it is within the contemplation of this invention that one of the legs may be shorter than the other so that only one of them actually makes such contact. Preferably the one which makes contact with the surface of the workpiece is the outermost leg; i.e., the one which is in spaced apart relationship from the cutting jaw to which it is affixed, as this will provide the greater mechanical advantage in holding the workpiece down. However, since some support in any event needs to be provided to hold the hold-down clamp upright as it moves relative to its associated cutting jaw, a downward, albeit shorter, inner leg provides that stability. Any such or functionally comparable configuration is referred to herein as being "U-shaped". Additionally, it should be noted that the term "alignment" herein is intended to mean roughly corresponding in position so that a hold-down surface will come into contact with a workpiece more or less at the same time as the cutting surface of its associated cutting jaw, but not necessarily exactly simultaneously, since there may be some instances where that result is desired. For example, it may be desired to just start the cut before the workpiece becomes firmly clamped as a means to ensure that the cutting edges, and not the clamps, mandate the position of a cut.

FIG. 4 is a front view cross section taken through the line "4—4" shown in FIG. 2. It shows the operation on a workpiece 100 of hold-down clamps 31, 30 relative to the associated cutter ends 28, 26 with which each respectively is paired. As shown, cutting closure has progressed to the point where the workpiece 100 has actually begun to be cut. By then the cutter ends 26, 28 are close to bypassing each other as their respective cutting edges 27, 29 approach each other. Already, however, the workpiece contact surfaces of their associated hold-down clamps 30, 31 have come into contact with the outer surfaces of the workpiece 100 and have just begun to move out of the position of alignment with their respectively associated cutting jaws toward which they are normally biased. The hold-down clamps are blocked from further closure movement in the direction of closure by the workpiece itself. As closure proceeds, the clamps exert increasingly strong retention pressure on the workpiece as the cutting jaws move closer together and move relative to their respectively associated hold-down clamps. This prevents the workpiece or segments thereof from bending and flying off as the cutter ends continue their closure action and cutting of the workpiece proceeds to take place. In addition, when actual severance of the workpiece occurs, any shock thereby generated will be more or less attenuated by the resilience of the hold-down assembly. This decreases any tendency of damaging shock to be transmitted along the workpiece to an associated component, such as an electronic device or assembly. Further, these structural arrangements make it possible for the foregoing cutting and retention actions to take place with a wide range of workpiece diameters (thicknesses) to which the operative elements automatically adjust.

FIGS. 5A through 5C inclusive illustrate, in cross section, the manner in which these various elements operate when the device is put into use. To demonstrate some of the wide variety of configurations the hold-down clamps can take within the contemplation of this invention, the hold-down clamp members 50, 58 are illustrated in FIGS. 5A through 8 to be angular, with integral flat planar elements 52, 60 respectively. They provide actual hold-down surfaces that are so oriented as to be substantially aligned with the cutting edges of the cutting member with which each clamp member 50, 58 is paired. As such, these hold-down clamp surfaces are analogous to the combination of the inner and outer legs of the U-shaped hold-down clamps previously discussed and shown in connection with the FIGS. 2–4 embodiments. However, L-shaped configuration is easier to form and provides a more continuous hold-down surface, thus making it particularly advantageous for use with certain materials such as stranded wire where a continuous flat surface may be better to maintain a firm grasp on the piece during and after cutting than are other configurations. Upon closure of the cutting jaws as shown in FIG. 5A the cutting jaws 46, 48, as well as the hold-down surfaces 52, 60 of hold-down clamps 58, 50 respectively, come into contact substantially simultaneously with the outer surfaces of the workpiece 100 that is to be severed. As closure proceeds, as is shown in FIG. 5B, separation of the workpiece into segments commences as a result of the shearing effect of the cutting jaws 46, 48 as their respective cutting edges approach each other and the jaws move toward bypassing each other until severance is complete as shown in FIG. 5C. The instant of complete severance of the workpiece can be sudden, with consequent flying off of the cut segment, shock transmission along the length of the workpiece, and other undesirable effects as heretofore described. However, these undesirable results are avoided by the retentive and shock absorbing effects of the hold-down clamps, yielding positionally to the pressure transmitted to them via the workpiece from the cutting jaw to which the other of the hold-downs is affixed.

The embodiment of this invention shown in FIGS. 6 through 8 inclusive is further adapted for use on workpieces that are particularly difficult to sever, such as larger thickness or larger diameter workpieces, and/or those made from harder materials. As such, it includes handle members 42, 44 and cutter members 46, 48 that are so arranged that closing of the former results in closure of the latter. Again, as shown, both movements are in the nature of closures, but it is within the contemplation of this invention that other combinations of relative motions, such as independent motion one relative to the other, might occur. In the FIGS. 6–8 embodiments, however, the mechanical advantage of the manipulation structures is enhanced by the linkages created as among the handle and cutting members by use of pivot pins 74, 76, 80. Although the hold-down clamp members 50, 58 as shown are angular in cross section, of course, they might optionally be of the U-shaped type previously discussed and shown or any other appropriate structural configuration that is adapted for the particular use to which the cutters are to be put.

Another feature of embodiments of the type shown in FIGS. 6–8 is that the bias on the hold-down clamp is provided by coil spring 64 acting cooperatively on the spring retainer element 62 on the hold-down clamp 50 that is pivotally mounted to cutting jaw 46 by means of a pivot pin 70 through backing plate 54. A similar arrangement (not shown) obtains with respect to the hold-down clamp 58 as well, which is pivotally mounted via a comparable backing plate 56 (shown) to cutting jaw 48 by means of a pivot pin 72. The design of these arrangements is simple, and their constituent elements are simple, standard and readily replaceable. Again, each of the hold-down clamps is pivotally affixed to one of the cutting jaws and normally aligned with its cutting edge, and is resiliently biased toward the other cutting jaw against movement out of that normal position away from said other jaw. Each such hold-down clamp is thus rendered responsive to pressure imposed by the other cutting jaw as it closes, thus assuring the retention of pressure on a workpiece with respect to it. As with other embodiments of this invention, the structures illustrated in FIGS. 6–8 may be made so that the cutting and/or hold-down surfaces are somewhat spaced apart when they are parallel to each other, or may be so structured according to known per se mechanical principles that they are substantially parallel to each other throughout their entire travel toward and away from each other or are contoured as shown in FIG. 2 to "pocket" a workpiece along their length. Use of such options may avoid or ameliorate any tendency for the workpiece, particularly if of larger diameter, to be thrust outward from between the cutters as they close. In addition, arrangements of the type shown in FIGS. 6–8 permit, via linkages of the type shown, very large mechanical advantages to be imparted to the cutting surfaces by the comparatively greater travel distance of the handle elements. This makes such arrangements especially useful where larger masses (diameters and/or thicknesses) and/or harder materials are to be cut.

Embodiments of this invention are also particularly advantageous for use in cutting harder stranded materials which tend to flatten out as cutting surfaces are brought to bear upon them, with consequent radical increase in the surface area presented to the cutting surfaces and greater difficulty, often to the point of impossibility, of making the cut. Especially when certain shaped clamp members are used, such as the U shapes previously described, the holding effect of the clamp surfaces tends to inhibit a stranded workpiece from unlaying and flattening, thereby assisting in making the desired cut.

Although, the embodiments described are in the nature of hand tools, it is to be understood that this invention may be used in connection with devices which operate other than by hand. It is also to be understood that although various elements are described as having or being in a certain geometrical or structural configuration, others may as well be utilized in carrying out this invention. Thus, it is to be understood that the embodiments of this invention herein shown and described are by way of illustration and not of limitation, and that a wide variety of embodiments may be made without departing from the spirit or scope of this invention.

I claim:

1. A shear-type cutter comprising
   a pair of elongated jaw members, each of which has a cutting edge at one end and pivotable handle connection means at the other end, which cutting jaws, by means of being centrally pivotally mounted on pivot pins which extend from a backing plate, are moveable into and out of laterally abutting relationship to each other with their cutting edges moving past each other to effect shearing action cutting,
   an elongated hold-down clamp member laterally abutting each of said jaw members, each of which hold-down clamp members
      is centrally pivotally mounted on the same pivot pin as is the jaw member which it laterally abuts and is pivotally moveable with respect to both that jaw member and the backing plate, and
      has a hold-down surface which is
      normally positioned in a predetermined relationship to the cutting edge of the jaw member which it laterally abuts and faces the other of said jaw members,
   resilient positioning means which
      interconnects each of said jaw members, in the region of its handle connection means end, with the region of the corresponding end of the hold-down clamp member which that jaw member laterally abuts, and
      positions that jaw member and that hold-down clamp member so that the cutting edge of that jaw member and the hold-down surface of that hold-down clamp member are positioned in said predetermined relationship to each other, and
      resiliently biases said handle connection means end of that jaw member and said corresponding end of that clamp member against moving toward each other, and
   an elongated handle member pivotally connected to each of said handle connection means, said handle members being connected to each other by pivot means.

2. The cutter described in claim 1 wherein said cutter is hand-manipulable.

3. The cutter described in claim 2 wherein each of said hold-down clamp members is L-shaped in cross section with the bottom of said L facing said other jaw to form said hold-down surface.

4. The cutter described in claim 1 wherein each of said hold-down clamp members is L-shaped in cross section with the bottom of said L facing said other jaw to form said hold-down surface.

* * * * *